Patented Nov. 21, 1944

2,363,231

UNITED STATES PATENT OFFICE 2,363,231

USING CRACKING CATALYSTS

Gerald C. Connolly, Baton Rouge, La., assignor to Standard Oil Development Company, a corporation of Delaware No Drawing. Application April 5, 1938, Serial No. 200,271

1 Claim. (Cl. 196—52)

This invention relates to using synthetic gels adapted for the treatment of hydrocarbons and particularly for the catalytic cracking of hydrocarbons. It more particularly pertains to using synthetic adsorptive catalysts having a high catalytic efficiency coupled with good regenerative properties.

While the catalysts will have a more general application, such as in other types of hydrocarbon reactions including purification, refining, and polymerization, they have been found to be particularly suitable for catalytic cracking.

It has previously been discovered that the cracking of hydrocarbon oil in the presence of certain solid adsorbent contact materials such as naturally active or activated clays results in the formation of high yields of motor fuel having high anti-knock properties.

During the cracking operation the contact mass becomes fouled more or less rapidly with carbonaceous deposits requiring periodic discontinuance of the cracking treatment to remove such deposits. This removal can be accomplished by passing an oxidizing gas through the mass and burning off the carbon. Such treatment results in the evolution of a considerable quantity of heat.

One objection to the use of adsorptive clays for catalytic cracking is that when exposed to high temperatures in excess of 1000° F. for example, such materials rapidly lose their catalytic activity. In view of this it is necessary to provide means for rapidly removing heat liberated during regeneration to avoid permanent impairment of the efficiency of the catalyst. One method of controlling regenerating temperature is to dilute the oxidizing gas with an inert gas to reduce the reaction rate and increase the capacity of the gases to remove heat of reaction. This necessarily slows down the regeneration and increases the length of time the catalyst and reaction chamber is out of operation thus requiring more reaction chambers to produce a given yield of gasoline.

Another method of regulating the temperature is to provide indirect heat exchangers within the reaction chambers. All of such temperature control provisions materially increases the expense of equipment for any given capacity.

Moreover, even when the regenerating temperature is accurately controlled to avoid excessive temperatures the activity of the catalyst is gradually reduced over an extended period. While the cause of this is not fully known, one explanation may be that the carbonaceous deposits contain traces of constituents, formed during the cracking or regenerating period, such as for example, graphitized carbon, which has a high ignition temperature and which cannot be burned at the low temperature necessary to avoid rapid deactivation of the catalyst.

Another objection to adsorptive clay catalysts is that the maximum efficiency even when freshly prepared is relatively low.

It is an object of the present invention to use an improved adsorptive cracking catalyst having a higher efficiency than previously prepared catalysts, which will maintain its efficiency over a longer period.

A further object of the invention is to utilize synthetic adsorptive catalysts having high catalytic activity coupled with excellent regenerative properties.

Another object of the present invention is to provide a more effective method of cracking hydrocarbon oils which will produce a motor fuel of improved quality.

Other more specific objects and advantages of my invention will be apparent from the more detailed description hereinafter.

The invention will be described with reference to the utilization of a two component catalyst comprising of silica and alumina as major constituents, it being understood that certain amounts of other components may be added as modifying agents by which is meant components serving as stimulators, activators, stabilizers, diluents or reinforcing agents for the catalyst.

One of the starting materials employed in the preparation of the catalyst is washed silica hydrogel. This material forms an intermediate product in the preparation of silica gel and its method of preparation is well known to those familiar with this art. One method of preparation is described for example in the Patrick Patent 1,297,724, to which reference is made for a more complete disclosure of its preparation.

Briefly the method comprises combining equal portions of sodium silicate solution and acid in such concentrations as to form a clear colloidal solution of silicic acid which upon standing sets into a firm hydrogel structure. To obtain best results care should be exercised in combining the solutions to avoid formation of an immediate gelatinous precipitate as pointed out in the above mentioned patent. Such gelatinous precipitates, however, may be employed in the present invention although they are not as suitable as the hydrogel. This firm hydrogel after being permitted to set until syneresis is fully developed is broken into small lumps and thoroughly washed until substantially free of reaction impurities. The washed hydrogel after draining to remove excess water constitutes one of the starting materials for preparation of the catalyst.

The silica hydrogel so formed differs from silica gel in that it has a jelly appearance whereas silica gel is hard glass-like material obtained by dehydrating the hydrogel. The hydrogel employed in the present invention may however, be subjected to partial dehydration insufficient to completely destroy its jelly-like appearance.

The preparation and washing of the silica hydrogel is controlled in such manner that 4-12 mesh granules of silica gel formed from a sample of said hydrogel by activating said hydrogel at a temperature of 1000° F. for a period of 4 hours have an apparent density of from 0.4 to 0.8 and preferably between 0.45 and 0.6 and specifically about 0.5. The term "apparent density" as here employed means the weight in grams per cubic centimeter of 4-12 mesh granules of the dried silica gel heat treated as above described. Four to 12 mesh granules are those capable of passing a 4 mesh U. S. standard sieve series screen but are caught on a 12 mesh screen.

Apparent density has been found to be an indirect but nevertheless definite method of determining pore size.

Various methods for controlling the apparent density of silica gel are known to those familiar with the art and need not here be disclosed in detail. The apparent density may be modified, for example, by changing the temperature and duration of the washing treatment. The apparent density may be decreased by increasing the temperature of the wash water or by prolonging the washing treatment. By washing with water at a temperature of 200° F. for a period of about 40 hours for example the apparent density will be of the order of about 0.5.

The alumina component of the final catalyst may be incorporated into the washed hydrogel by any one of the following methods or by any combination thereof.

The first method comprises homogenizing the desired amount of powdered aluminum oxide with the hydrogel.

The homogenizing treatment may be carried out in any suitable apparatus designed for the purpose such as a ball mill or its equivalent.

The aluminum oxide may be in any form having a pronounced capillary structure such as "acvated alumina," (formed by dehydrating aluminum hydroxide precipitated as scale on precipitating tanks employed in producing metallic aluminum), aluminum gel or relatively pure adsorbent bauxite.

The homogenized mixture is dried by heating to dehydrate the silica hydrogel into silica gel. This may be accomplished by slowly heating to a temperature of about 800° F. for example.

The resulting product may be employed in granular form or formed into pellets of uniform size by pilling or extruding.

A second method of combining the alumina with the silica hydrogel is to homogenize a mixture of the silica hydrogel with a hydrous oxide of alumina as in a ball mill or equivalent. The alumina hydrous oxide is also an intermediate product in the formation of alumina gel and its method of preparation is known to those familiar with the art.

In brief the method may consist in combining a 10% solution of hydrated aluminum sulphate $(Al_2(SO_4)_3.18H_2O)$ with a normal solution of ammonium hydroxide while stirring at substantially room temperature. The resulting solution should contain a slight excess of ammonium hydroxide. If conditions are properly controlled a highly gelatinous hydrous oxide gel of alumina results. This hydrous oxide gel is then washed until substantially free of reaction impurities.

The homogenized mixture of hydrogels are dried as in the first method to dehydrate the hydrogels into a dry porous structure.

If it is desired to incorporate a catalyst modifying agent into the catalyst this may be accomplished by adding the modifying agent to the hydrosol prior to formation of the silica hydrogel, by incorporating into the silica hydrogel or into the alumina component in any of its various forms prior to its admixture with the hydrogel as hereinbefore described.

As illustrative of the advantages of preparing the catalyst according to the invention the following comparative examples may be helpful.

In all of the following examples the cracking efficiency of the catalyst was determined under the following conditions.

A vaporized East Texas gas oil of 33.8 A. P. I. gravity preheated to 850° F. was passed through a reaction chamber containing the catalyst at a rate of 0.6 volume of liquid feed per volume of catalyst per hour. The reaction chamber was maintained at a temperature of 850° F. and the cracking period was extended over two hour periods. Unless otherwise specified the catalyst was employed in pill form of a size of about 1 centimeter in diameter and 2 centimeters in length. The percentage conversion is reported as the total liquid distillate recovered having an end point of 400° F.

*Experiment 1*

Pills of dry silica gel when tested under the above conditions resulted in a conversion of about 2 per cent.

*Experiment 2*

Dry alumina gel pills under the same conditions resulted in a conversion of about 16%.

*Experiment 3*

A series of pills formed from mixtures of dry silica and alumina gels having molar ratios of silica and alumina of 15 to 1, 10 to 1, 7.5 to 1, 5 to 1 and 2.5 to 1 when tested under the above conditions resulted in conversions of 12%, 16.2%, 15%, and 16% respectively.

Experiments 1 and 2 show that neither silica gel nor alumina gel, even though both possess adsorbent properties, form active cracking catalysts. Experiment 3 shows that mechanical mixtures of dry silica and alumina of varying proportions likewise possess low cracking activity.

*Experiment 4*

Finely divided dry alumina gel was combined with silica hydrogel according to the first method herein described in which a silica hydrogel was homogenized with powdered dry alumina gel in a ball mill. The amount of silica hydrogel and finely divided alumina gel employed was controlled to produce a catalyst having a mol ratio of silica to alumina of 5 to 1. The product in pill form when tested under the same conditions resulted in conversions of 49.5%.

Experiment 5

As a further example of the effect of the method of synthesis of the catalyst a product was prepared by homogenizing finely divided dry silica gel with aluminum hydrogel. This product had a molar ratio of silica to alumina of 5 to 1. This catalyst under the same conditions resulted in conversions of 20%.

homogenized in a ball mill dried and pilled. These products when under the same conditions caused conversions of 52%, 47.5%, 44% and 42% respectively.

For comparative purposes the results obtained from the various catalysts described in the above experiments are summarized in the following table:

| Catalyst | Preparation | Molar ratio $SiO_2:Al_2O_3$ | Apparent density [1] | Per cent conversion |
|---|---|---|---|---|
| Silica ($SiO_2$) | Dry gel | | 0.4 | 2 |
| Alumina ($Al_2O_3$) | ....do.... | | 0.75 | 16 |
| $SiO_2 + Al_2O_3$ | Mixed dry gels | 15:1 | 0.4 | 12 |
| Do | ....do.... | 10:1 | 0.4 | 16.2 |
| Do | ....do.... | 7.5:1 | 0.4 | 15 |
| Do | ....do.... | 5:1 | 0.4 | 15 |
| Do | ....do.... | 2.5:1 | 0.4 | 16 |
| Do | $SiO_2$ hydrogel + ignited $Al_2O_3$ | 5:1 | 0.43 | 7 |
| Do | $SiO_2$ hydrogel + dried Al(OH)$_3$ | 5:1 | 0.43 | 13.5 |
| Do | $SiO_2$ hydrogel + activated alumina | 5:1 | 0.43 | 27.5 |
| Do | $SiO_2$ hydrogel + dry alumina gel | 5:1 | 0.5 | 49.5 |
| Do | $SiO_2$ hydrogel + alumina hydrogel | 10:1 | 0.55 | 52 |
| Do | ....do.... | 7.5:1 | 0.55 | 47.5 |
| Do | ....do.... | 5:1 | 0.55 | 44 |
| Do | ....do.... | 2.5:1 | 0.55 | 42 |
| Do | Alumina hydrogel + dry $SiO_2$ gel | 5:1 | 0.41 | 20 |

[1] Apparent density of the silica gel formed from the silica hydrogel.

Experiment 6

Another product was prepared according to the first method except that in place of using dry alumina gel, dry finely divided ignited alumina was employed. This product had no capillary structure. Tests of this material resulted in a conversion of 7%.

Experiment 7

Another product was prepared according to the first method using finely divided dried aluminum hydroxide having a slightly porous structure of high density. This product resulted in a conversion of 13½%.

Experiment 8

Another catalyst of similar nature was prepared using "activated alumina" which has a capillary structure but of higher density than dry alumina gel. This product resulted in a conversion of 27½%.

Experiment 9

A mixed catalyst was prepared according to the second method hereinbefore described in which hydrogel of silica and hydrogel of alumina were mixed in proportions to give final products having molar ratios of silica to alumina of 10 to 1, 7.5 to 1, 5 to 1, and 2.5 to 1. The mixed hydrogels were While I have described the dehydration of the silica hydrogel to a dry gel as a separate operation independent of the cracking treatment it will be understood that such dehydration can be accomplished within the reaction chamber in which the cracking is carried out either before or in the initial stage of the cracking operation.

Having described the preferred embodiment and given specific examples thereof it will be understood that my invention embraces such other variations and modifications as come within the spirit and scope thereof. It will also be understood that it is not my intention to dedicate to the public any novel features thereof.

I claim:

In a method of cracking hydrocarbon oils to produce motor fuel therefrom by passing oil at cracking temperature in contact with a synthetic cracking catalyst; the steps of preparing said catalyst which comprise commingling a solution of sodium silicate and an inorganic acid, the amount of acid employed being in excess of that necessary to react with said sodium silicate to thereby form a clear silica hydrosol, causing said hydrosol to coagulate into a firm hydrogel, thereafter washing the hydrogel substantially free of reaction impurities, incorporating alumina having a capillary structure into the hydrogel so formed and subsequently drying the resulting mixture of silica and alumina.

GERALD C. CONNOLLY.